July 17, 1934.  D. L. DRAKE  1,966,663
PEENING DEVICE
Filed April 17, 1933
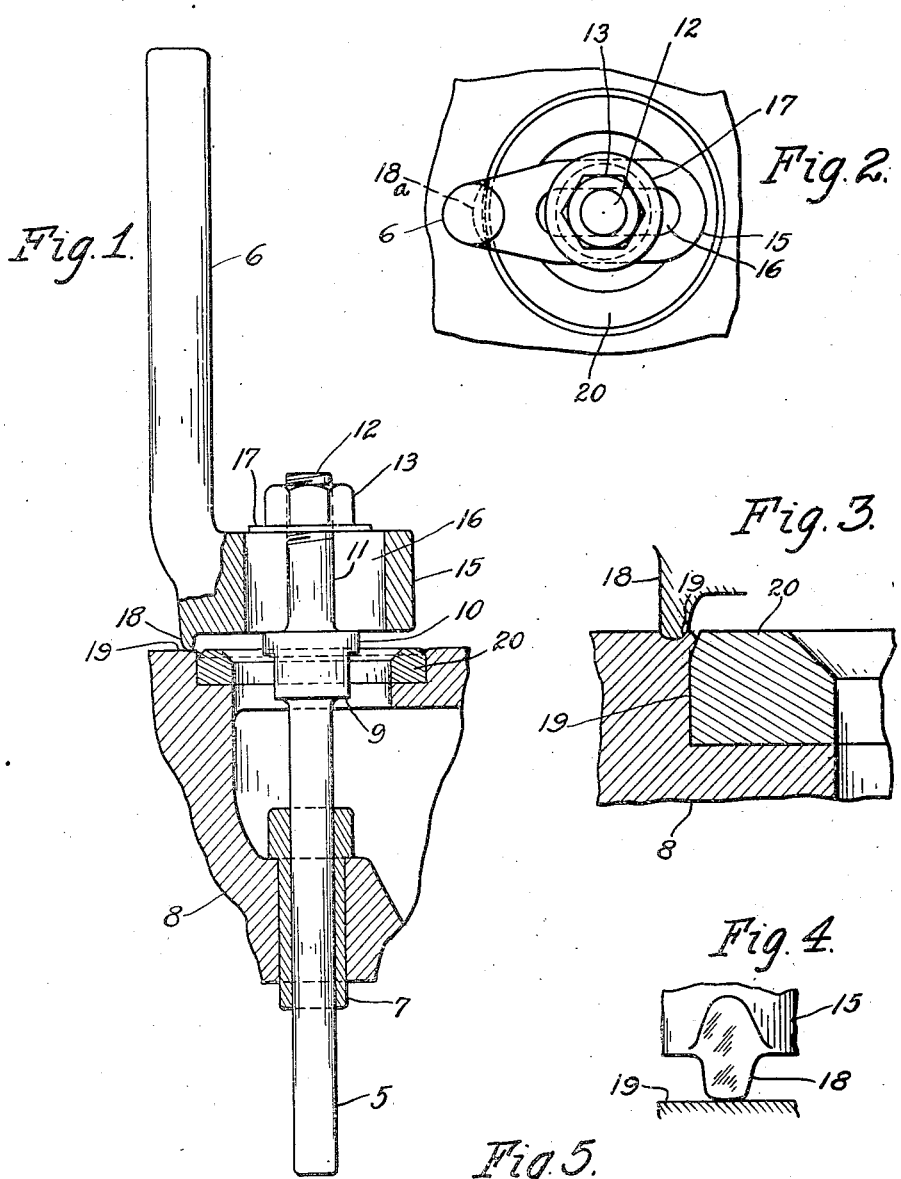
INVENTOR.
Dale L. Drake
BY Robt. D. Pearson
ATTORNEYS.

Patented July 17, 1934

1,966,663

UNITED STATES PATENT OFFICE 1,966,663

PEENING DEVICE

Dale L. Drake, Bell, Calif.

Application April 17, 1933, Serial No. 666,392

2 Claims. (Cl. 78—1)

This invention relates to a peening tool more particularly intended for use in securing in place valve seat rings, but possibly capable of other uses.

An object of the invention is to provide a peening tool which can readily be adjusted to follow accurately around the circumference of a valve seat in such a manner that, by the use of a hammer the workman may peen the edge of the valve seat counterbore over upon the periphery of the valve seat ring in a very rapid and efficient manner.

Other objects and advantages of the invention relate to the formation of a very simple tool of the character stated, one which may readily be constructed by drop forging with a minimum amount of machine work.

Other objects, advantages and features of the invention may hereinafter appear.

Referring to the accompanying drawing which illustrates what is at present deemed to be a preferred embodiment of the invention, Fig. 1 is a vertical mid-section of the device showing the same in position for peening the edge of a valve seat over upon the periphery of a valve seat ring, parts being shown in side elevation.

Fig. 2 is a plan view of the structure shown in Fig. 1.

Fig. 3 is a sectional detail on an enlarged scale illustrating more fully the peening operation.

Fig. 4 is a side elevation of the peening element showing a fragment of the adjacent construction.

Fig. 5 is a bottom plan view of the peening element.

Referring in detail to the drawing, the peening tool provided by this invention comprises two main parts adjustable in relation to each other, a guiding stem portion 5 whereby the device is held in the proper operative position, and a driver arm 6. Said stem 5 is shown fitted within a valve guide bushing 7 which in turn is fitted within a bore provided therefor in the engine head 8. Said stem 5 is provided with a diametrically enlarged portion 9 which in turn is furnished at opposite sides of its upper portion with an outwardly directed shoulder 10. Above these shoulders 10 the stem is provided with an upper portion 11 the terminal part 12 of which is provided with screw threads to receive a clamping nut 13. A very simple, compact and satisfactory supporting and guiding means is thus provided for the driver element of the tool.

In the manufacture of the device a single driver arm portion 6 is made to cooperate with a set of the stem elements 5, that is to say, a number of stems of different diameters are provided to fit different sizes of valve guides or valve bushings and the particular stem which is used in the given instance is attached to the driver element 6 thus preparing the tool for operation.

With the portion of the tool which has been described cooperates the driver member 6, said member having a laterally deflected foot portion 15 which is located at one extremity thereof and is provided with a slot 16. The width of said slot 16 preferably is just sufficient to make a working fit between it and the stem portion 11. Therefore when the parts are assembled as shown in Fig. 1 the shoulders 10 abut against the lower side of the slot 16 while the stem portion 11 projects upwardly through and beyond said slot. A washer 17 is then placed over the stem portion 11 and the nut 13 screwed into place to clamp the parts in an adjusted relation to each other.

The foot portion 15 is provided at the same side thereof as the arm 6 with a peening toe 18 which is adapted to peen the edge of the valve seat counterbore 19 over upon the periphery of the valve seat ring 20. As shown in the drawing the parts are so adjusted with relation to each other that the peening element 18 will engage the valve seat counterbore 19 slightly back of the inner side thereof.

Describing more in detail the construction of the element 18a shown in Fig. 2 is preferably flat faced.

Preparatory to putting the device into use the workman will select from the set of guide elements at hand a guide stem which will fit the bushing or bore of the cylinder head upon which the tool is to be used. He will then, while holding said guide stem in the position shown in Fig. 1 of the drawing, place the driver element over the upper portion thereof at the same time adjusting the position of the driver element so as to bring the peening element adjacent to the edge of the valve seat to be peened down, it being understood that the valve seat ring 20 has previously been put into place. He will then apply the washer 17 and nut 13, screwing the latter firmly down to clamp the parts together in the adjusted position. The workman is then ready to repeatedly strike the upper end of the driver arm 6 with a hammer held in one hand while with the other hand he rotates said driver arm together with its peening element 18 around the seat of the valve which is being peened over upon the valve seat ring. Owing to the fact that the driver arm 6 extends substantially parallel to the axis of the guide stem 5, the blows of the hammer upon the upper end of the driver arm are directed squarely against the top surface of the edge portion of the valve seat. The operation of the hammer therefore does not cause any lateral strain upon the upper portion of the guide stem 5.

I claim:

1. In a peening tool, the combination of a driver element consisting of an arm having one of its extremities laterally deflected and its other extremity positioned to receive hammer blows, and a rotatable support for said driver element, said support consisting of a stem having a diametrically enlarged portion and a screw threaded portion adjacent to said diametrically enlarged portion, and a clamping nut to screw on to said threaded portion of said stem in order to clamp said deflected extremity of the driver element between itself and said diametrically enlarged portion.

2. In a peening tool, the combination of a driver element consisting of an arm having one of its extremities laterally deflected and its other extremity positioned to receive hammer blows, and a rotatable support for said driver element, said support consisting of a stem having an outwardly directed shoulder and a screw threaded portion adjacent to said shoulder, and a clamping nut to screw on to said threaded portion of said stem in order to clamp said deflected extremity of the driver element between itself and said shoulder.

DALE L. DRAKE.